US007003197B2

(12) United States Patent
Andre et al.

(10) Patent No.: US 7,003,197 B2
(45) Date of Patent: Feb. 21, 2006

(54) OPTICAL FIBER HAVING AT LEAST ONE BRAGG GRATING OBTAINED BY WRITING DIRECTLY THROUGH THE COATING COVERING THE CLADDING

(75) Inventors: Sébastien Andre, Pignan (FR); Samuel Merlet, Lyons (FR)

(73) Assignee: Alcatel, Paris (FR)

( * ) Notice: Subject to any disclaimer, the term of this patent is extended or adjusted under 35 U.S.C. 154(b) by 56 days.

(21) Appl. No.: 10/748,278

(22) Filed: Dec. 31, 2003

(65) Prior Publication Data

US 2004/0228594 A1 Nov. 18, 2004

(30) Foreign Application Priority Data

Jan. 3, 2003 (FR) .................................. 03 00027

(51) Int. Cl.
*G02B 6/34* (2006.01)
*G02B 1/10* (2006.01)

(52) U.S. Cl. ............................. 385/37; 385/9; 385/10; 385/37; 385/123; 385/124; 385/125; 385/126; 385/127; 385/128; 385/141; 385/142; 385/143; 385/144; 427/163.1; 427/163.2

(58) Field of Classification Search .................. 385/10, 385/37, 123–128, 141–144, 9; 427/163.1, 427/163.2
See application file for complete search history.

(56) References Cited

U.S. PATENT DOCUMENTS

| | | | | |
|---|---|---|---|---|
| 4,933,259 | A * | 6/1990 | Chihara et al. | 430/280.1 |
| 5,773,486 | A | 6/1998 | Chandross et al. | |
| 5,989,627 | A | 11/1999 | Blyler, Jr. et al. | |
| 6,396,983 | B1 | 5/2002 | Atkins et al. | |
| 6,579,914 | B1 * | 6/2003 | Gantt et al. | 522/92 |
| 2003/0199603 | A1 * | 10/2003 | Walker et al. | 522/99 |
| 2003/0202763 | A1 * | 10/2003 | Starodubov | 385/128 |

FOREIGN PATENT DOCUMENTS

| | | |
|---|---|---|
| EP | 0 990 625 A | 4/2000 |
| EP | 1 172 391 A1 | 1/2002 |

OTHER PUBLICATIONS

C. Decker, "High-speed curing by laser irradiation", Nuclear Instruments & Methods in Physics Research, Section - B: Beam Interactions With Materials and Atoms, North-Holland Publishing Co., Amsterdam, NL, vol. 151, NR, 1-4, pp. 22-28, XP004416403.

U.S. Appl. No. 10/748,282 entitled "An Optical Fiber Having at Least one Bragg Grating Obtained by Writing Directly Through the Coating Covering the Cladding", filed Dec. 31, 2003.

K. Inamura et al, "High reliability tin-codoped germanosilicate fibre Bragg gratings fabricated by direct writing method", Electronic Letters, IEE, Stevenage, GB, vol. 34, No. 18, Sep. 3, 1998, pp. 1172-1773, XP006010237.

* cited by examiner

*Primary Examiner*—Brian Healy
*Assistant Examiner*—Jerry Martin Blevins
(74) *Attorney, Agent, or Firm*—Sughrue Mion, PLLC

(57) ABSTRACT

An optical fiber (1') having at least one Bragg grating (11), the fiber comprising a core (2) surrounded successively by cladding (3) and by a coating (4), the grating being obtained by being written directly in the core and/or the cladding of the fiber through the coating which is made of a material that is substantially transparent to ultraviolet type radiation used for writing the grating, and wherein the material of the coating contains a first polymer network interpenetrated by a second polymer.

18 Claims, 2 Drawing Sheets

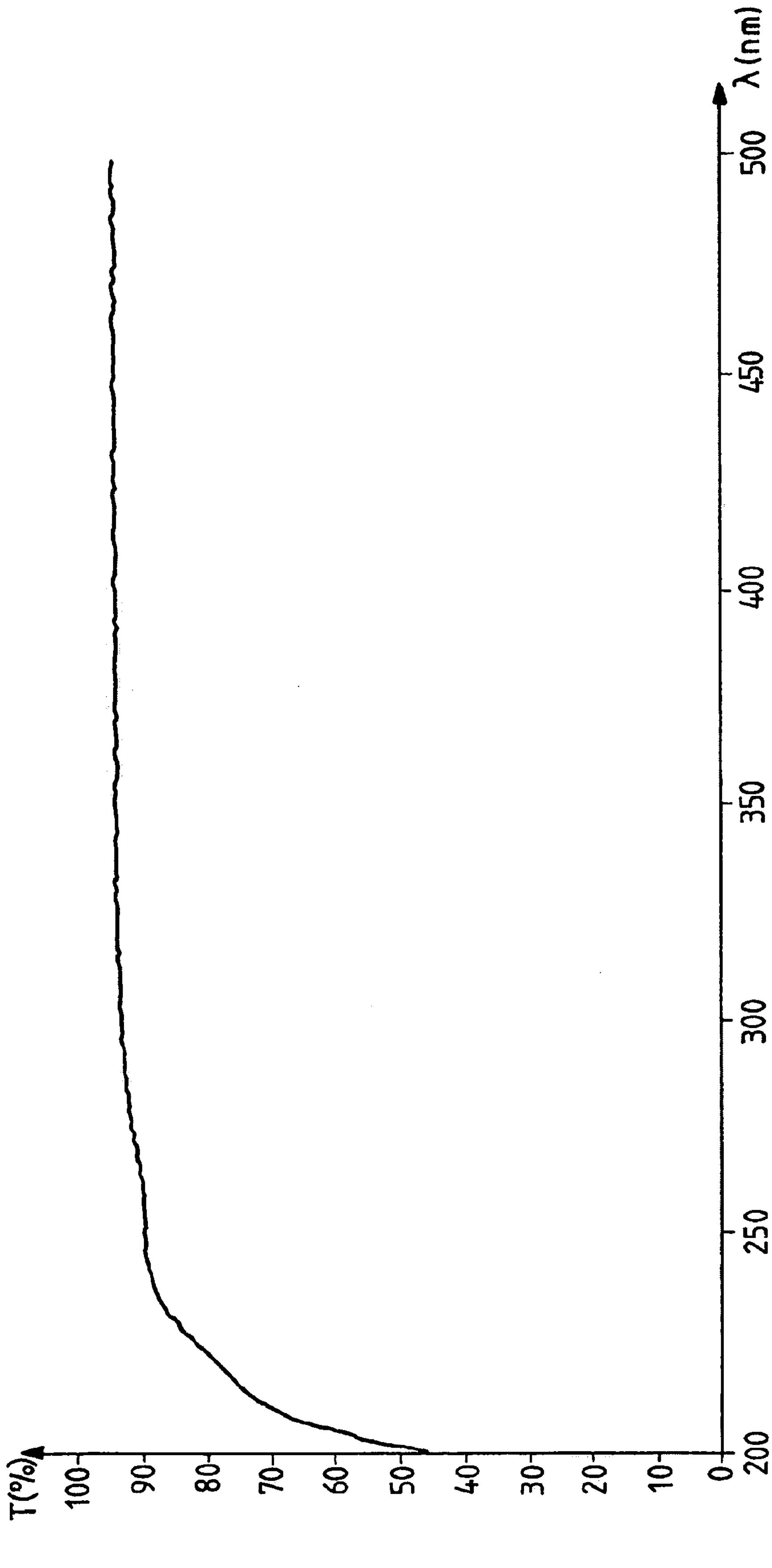
FIG_1

FIG_2
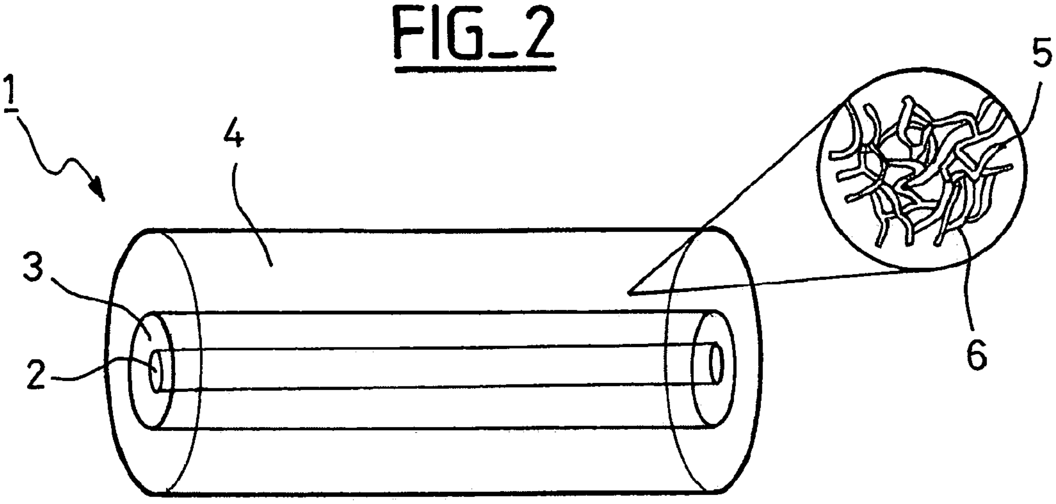
FIG_3
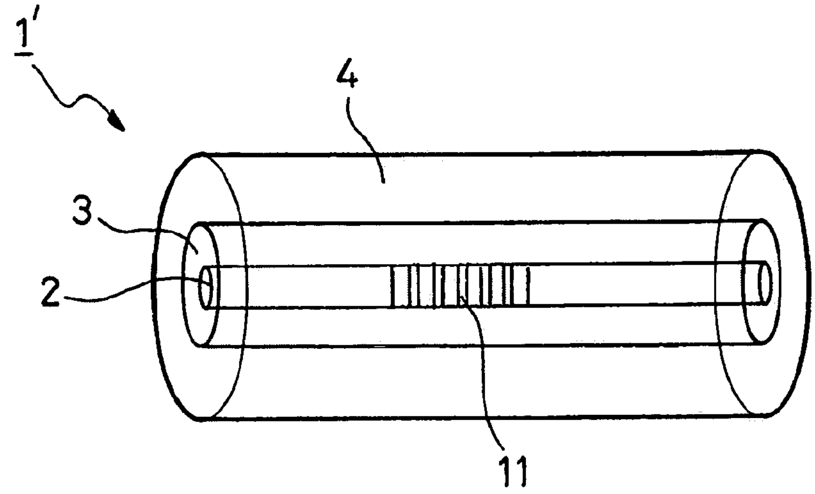

OPTICAL FIBER HAVING AT LEAST ONE BRAGG GRATING OBTAINED BY WRITING DIRECTLY THROUGH THE COATING COVERING THE CLADDING

The present invention relates to an optical fiber having at least one Bragg grating obtained by writing directly through the coating covering the cladding.

In known manner, optical fibers with a Bragg grating comprise a germanium-doped silica core covered successively by silica cladding and by a coating of material selected to be transparent and to withstand the temperature of the radiation used for writing the grating, which radiation is generally emitted by an ultraviolet (UV) type laser. This enables the Bragg grating to be written in the core and/or the cladding directly through said coating.

The document entitled "Grating writing through fiber coating at 244 nm and 248 nm" by Chao et al., Electronics Letters, May 27, 1999, Vol. 35, No. 11, pp. 924–925, thus discloses a fiber having a Bragg grating obtained by writing the grating directly in the core of the fiber through its coating.

The coating is of silicone which presents transmittance equal to about 90%, in particular at the two UV wavelengths conventionally used for writing gratings: 244 nm and 248 nm. The ability of such silicone to withstand temperature is demonstrated by being placed in an oven at 300° C. for 3 minutes (min).

The smallest Bragg grating described is 1 centimeter (cm) long and presents low contrast, i.e. variation in refractive index, of $2\times10^4$, corresponding to reflectivity of 92%.

Furthermore, writing is performed using a technique in which the laser beam is scanned, and that requires complex apparatus.

The mechanical properties of that silicone are unsatisfactory, particularly in terms of longevity, and for example the fiber can deteriorate during storage. Furthermore, that silicone does not withstand water sufficiently, which is critical for undersea connections.

The silicone is produced under the reference RTV615 by the supplier General Electric and is obtained from a two-component composition that sets at ambient temperature, in six to seven days at 25° C., and that comprises, in conventional manner, two precursors of silicone for mixing together immediately before application to the cladding of the fiber. The lifetime of the mixture is 4 hours.

That composition has low viscosity and is difficult to put into form. As soon as the two precursors have come into contact, the viscosity of the mixture varies very quickly which means that the thickness of the coating which is equal to 60 micrometers ($\mu$m) on average is not constant over the entire length of the fiber. In addition, the fiber cannot be reeled onto itself quickly since the setting time is of the order of several days. Contact between two lengths of fiber during setting leads to the coatings of the lengths becoming stuck together.

An object of the invention is to mitigate the above-mentioned problems by providing an optical fiber with at least one Bragg grating obtained by writing directly through the coating covering the cladding, the coating being optimized in terms of ability to withstand temperature, in terms of ability to withstand photochemical attack, and in terms of transparency to the type of UV radiation used for writing. The fiber must have good mechanical properties, long lifetime, and the Bragg gratings must present optical properties that are adjusted as a function of the intended applications.

For this purpose, the invention provides an optical fiber having at least one Bragg grating comprising a core surrounded successively by cladding and a coating of a material that is substantially transparent to ultraviolet type radiation for writing said grating, the optical fiber being characterized in that the material of said coating contains a first polymer network interpenetrated by a second polymer.

In conventional manner, the term "interpenetrated (or interpenetrating) polymer network" (IPN) is used to designate a polymer network that has another polymer network interpenetrating therein three-dimensionally. Consequently, there are two independent networks which are engaged one in the other. IPNs are described by L. H. Sperling in the document entitled "An overview of interpenetrating networks" in Polymeric Materials Encyclopedia, J. C. Salamone Ed., Vol. 5, CRC Press: Boca Raton, Fla., 1996.

More precisely, in a structural classification, there exist IPNs having two three-dimensional (3D) networks, homo-IPNs, semi-IPNs, pseudo-IPNs, and latex IPNs.

In the present description, the material of the invention can contain any one of the above-mentioned types of IPN.

An IPN having two 3D networks corresponds to two networks that are ideally juxtaposed, thereby creating a large number of interactions and entanglements between the networks.

Homo-IPNs are IPNs in which the two 3D networks are made out of the same polymer.

In semi-IPNs and pseudo-IPNs, one of the two components presents a structure that is linear instead of a 3D network structure. In other words, there is only one 3D network present in the thermoplastic. The thermoplastic cannot move in the network since this inertia is associated firstly with the length of the polymer chains, which by definition are of very great size—mean weight in number of thermoplastics lying in the range 10,000 to 1 million grams per mole ($g.mol^{-1}$)—and secondly to the density of the 3D network. If the amount of cross-linking is large, then the thermoplastic will be highly entangled with the network and will have difficulty in escaping therefrom.

IPNs are heterogeneous materials like mixtures of polymers. Polymer mixtures and IPNs are close in terms of composition, but there nevertheless exist differences that are quite distinct. In general, polymer mixtures comprise two or more polymers which are merely mixed together. In such mixtures, none of the components is cross-linked, whereas IPNs comprise two polymer components that are cross-linked and entangled: such a "blocked" or "frozen" structure of cross-linked polymers ensures that the material is stable over time, thereby causing IPNs to be superior to other multi-component materials.

Two incompatible polymers that are intimately mixed together will tend to separate from one another (in application of thermodynamics). Nevertheless, if the mixture is blocked by cross-linking before its components begin to separate, in particular by creating an interpenetrating network, than the two components cannot separate.

IPNs present major advantages compared with polymer mixtures. The use of multi-component systems makes it possible to obtain materials presenting a wide range of properties, possibly together with a synergy effect amongst one or more of the properties. Finally, the use of 3D networks makes it possible to obtain materials that withstand most organic solvents better.

The material of the invention is designed in such a manner as to obtain transparency to ultraviolet radiation, to increase ability to withstand high temperature and photochemical attack on the coating, even at high levels of fluence (energy density) while conferring improved mechanical properties to the fiber, improved ability to withstand water, and also to withstand organic solvents.

The material of the invention may contain one or more of the following chemical bonds: C—C, C—Si, C—I, C—H, C—O, O—H, Si—O, Si—H, C—F, C—Cl, Ge—C, Ge—Si, which bonds do not present significant absorbance in the ultraviolet at wavelengths longer than or equal to 240 nanometers (nm).

The material should also be selected to be free from aromatic rings, and free from conjugated unsaturations, since those items absorb ultraviolet radiation strongly.

For example, additives that are commonly used to obtain a polymer, e.g. based on acrylate cross-linked by ultraviolet radiation, generally contain such groups and should therefore be avoided because of their opaqueness.

Similarly, catalysts based on metal and in particular on platinum such as $Pt(AcAc)_2$, $PtCpMe_3$ as are used for obtaining a polymer by hydrosilylation should be avoided particularly since the presence of metal reduces the longevity of the fiber.

Advantageously, said first polymer network can be obtained from a first component that can be cross-linked by one of the following cross-linking operations: photocuring and thermocuring.

Photocuring is already in widespread use for manufacturing optical fibers since it is fast, easy to implement, and capable of being performed in a fiber-drawing tower.

In known manner, an IPN is either sequential or simultaneous.

A sequential IPN is formed by polymerizing a first mixture of a monomer, a cross-linking agent, and an initiator so as to form a first network. This network is subsequently "inflated" with the second mixture which, on polymerizing, forms the second network entangled in the first.

A simultaneous IPN is formed by simultaneously polymerizing both pairs, each comprising a monomer and a cross-linking agent. In this process, the two monomers must polymerize using two reactions that do not interfere with each other.

A homo-IPN can be made using a simultaneous process. Semi-IPNs are obtained using a sequential process, and generally the 3D network is formed in the presence of the thermoplastic, whereas pseudo-IPNs are obtained via a simultaneous process.

An IPN having two 3D networks can be made via a process that is sequential or simultaneous.

In a first embodiment, the second polymer forms a second polymer network and said first polymer network is obtained from said first cross-linkable component by a first of said cross-linking operations and the second polymer network is obtained from a second cross-linkable component by a distinct second one of said cross-linking operations.

The first component may be a polymer precursor that is photocurable, carrying a photocurable function preferably selected from acrylate, methyacrylate, thiol polyene, epoxy, and vinyl ether functions, and said second component is a polymer precursor that is thermocurable.

Said material of the invention may be obtained from a liquid mixture comprising 3% to 95% by weight of a photocurable silicone precursor and preferably 64.5%, and 5% to 95% by weight of a thermocurable silicone precursor, and preferably 34.5%. In general, the proportions by weight of the two networks confer good physical properties and good transparency at the wavelength used for writing.

In a second embodiment, the second polymer forms a second polymer network and said first polymer network is obtained from said first component that is photocurable using a cation method and said second polymer network is obtained from a second component that is photocurable using a radical method.

In a third embodiment, said IPN is a semi-IPN or a pseudo-IPN, said second polymer is a thermoplastic preferably selected from polyvinylidene fluorides and copolymers of polyvinylidene fluorides and hexafluoropropene (HFP).

The invention is applied to an optical device incorporating an element made of a material as defined above.

The invention is naturally suitable for manufacturing devices containing a fiber as defined above. By way of example, mention can be made of optical filters, demultiplexers, dispersion compensators, and in particular gain equalizing filters, and most particularly passive tilt equalizing (PTEQ) filters.

The material of the invention may also be used for any element other than a fiber providing there is a need for UV transparency and/or ability to withstand high temperatures and/or an ability to withstand chemical attack. For example, the element must comprise an adhesive, a phase mask, or an optical component.

The features and advantages of the invention appear clearly on reading the following description made by way of illustrative and non-limiting example and given with reference to the accompanying figures, in which:

FIG. 1 shows the profile of transmittance T (expressed in %) as a function of wavelength (expressed in nm) for a silica substrate coated in a material of the invention containing an IPN;

FIG. 2 shows an optical fiber for having a grating photoinscribed therein in accordance with the invention; an FIG. 3 shows an optical fiber having a Bragg grating in a preferred embodiment of the invention.

The invention lies in selecting a material containing an IPN that is appropriately selected for coating an optical fiber having one or more Bragg gratings, i.e. enabling the coating to be obtained quickly, allowing the Bragg grating to be written directly through the coating, and conferring good mechanical properties to the coated fiber.

The step of forming the coating comprises initially preparing a liquid mixture containing:

preferably 64.5% by weight of a precursor for a polymer, preferably silicone, carrying a photocurable function preferably selected from acrylate and epoxy functions, e.g. as sold by the suppliers Rhodia, BASF, UCB, Roth; and preferably 35.5% by weight of a precursor of a thermocurable polymer, preferably silicone, e.g. products sold by the suppliers Dow Corning, Rhodia, Wacker.

The photocurable portion makes it easier to manufacture the fiber on an industrial scale.

The thermocurable portion improves thermomechanical properties, UV transparency, and viscosity control, in contrast to a portion that is curable at ambient temperature.

This mixture of viscosity that is controlled and equal to 5 pascal seconds (Pa.s) is subsequently applied to fiber cladding as a single layer having a thickness of 60 micrometers ($\mu$m) by using a coating tower. The viscosity may vary in controlled manner over the range 0.2 Pa.s to 10 Pa.s depending on the nature and the composition of the various ingredients.

The IPN formed after the curing operations contains a first polymer network interpenetrated by a second polymer network and it is free from aromatic rings, free from conjugated unsaturations, and it is transparent to and capable of withstanding radiation of the ultraviolet type as is used for writing a Bragg grating.

FIG. 1 shows the profile of transmittance T (expressed in %) as a function of wavelength (expressed in nm) for a silica substrate coated in 60 μm of material containing the above-described IPN.

In FIG. 1, it can be seen that transmittance T exceeds 90% in the range 250 nm to 500 nm, i.e. over a wide range of wavelengths.

The silicone precursor is photocurable by radiation at a wavelength that is optionally different from that used for writing the grating, given that the silicone becomes transparent once it has been cured. It is important to select a photoinitiator (where necessary) that does not absorb at the wavelengths used for writing the grating.

The fiber obtained after forming the coating is shown in longitudinal view in FIG. 2 where there can be seen an optical fiber 1 comprising a germanium-doped silica core 2 covered successively by silica cladding 3 and by a coating 4 of the material containing an IPN.

This fiber can be wound without breaking onto a reel for hydrogenation, and it can be stored for several months on the reel.

The first polymer network 5 is interpenetrated by the second polymer network 6 (see enlarged zone in FIG. 2).

A Bragg grating is subsequently written statically through the coating using a UV laser source emitting at a wavelength selected to be 248 mm, for example. FIG. 3 is a longitudinal view of a fiber 1' having a Bragg grating in a preferred embodiment of the invention.

The characteristics of the Bragg grating 11 written in the core 2 are as follows:

written length: 4.6 millimeters (mm);

contrast: $2.2\times10^{-4}$;

depth: 6.8 decibels (dB) at 1568 nm.

The contrast achieved is high without damaging the coating 4 even when the selected level of fluence (energy density) is high, e.g. 756 joules per square centimeter ($J/cm^2$): the material thus presents very high levels of ability to withstand photochemical attack and high temperatures.

The fiber 1' having a Bragg grating is, for example, for incorporation in an optical device (not shown), e.g. of the type comprising a gain equalizing filter for optical amplifiers, a chromatic dispersion compensator, or an optical add-and-drop multiplexer.

In a first variant, the fiber 1' may also have a Bragg grating in the cladding 3.

In another variant, in order to increase the refractive index of the grating to above 1.45—which corresponds to the index of germanium-doped silica-suitable refractive index additives are added in the settable liquid mixture used for manufacturing an effective slanted Bragg grating fiber.

Naturally, the invention is not limited to the embodiment described above.

The fiber may contain a plurality of Bragg gratings, with the length of the or each Bragg grating being adapted as a function of the intended application.

Finally, any means may be replaced by equivalent means without going beyond the ambit of the invention.

What is claimed is:

1. An optical fiber having at least one Bragg grating, the fiber comprising a core surrounded successively by cladding and by a coating, said fiber being obtained by directly writing said grating in the core or the cladding through the coating which is made of a material that is substantially transparent to the ultraviolet radiation used for writing said grating, in which the material of said coating contains a first polymer network interpenetrated by a second polymer.

2. An optical fiber having at least one Bragg grating according to claim 1, in which said first polymer network is obtained from a first component that is cross-linkable by one of the following cross-linking operations: photocuring and thermocuring.

3. An optical fiber having at least one Bragg grating according to claim 2, in which, when the second polymer forms a second polymer network, said first polymer network is obtained from said first cross-linkable component by a first of said cross-linking operations and the second polymer network is obtained from a second cross-linkable component by a distinct second one of said cross-linking operations.

4. An optical fiber having at least one Bragg grating according to claim 3, in which the first component is a photocurable polymer precursor carrying a photocuring function, and said second component is a precursor for a thermocurable polymer.

5. An optical fiber having at least one Bragg grating according to claim 1, in which said material is obtained from a liquid mixture comprising 3% to 95% by weight of a precursor of photocurable silicone and 5% to 97% by weight of a precursor of thermocurable silicone.

6. An optical fiber having at least one Bragg grating according to claim 1, in which, when the second polymer forms a second polymer network, said first polymer network is obtained from said first photocurable component by a cationic method and said second polymer network is obtained from a second photocurable component by a radical method.

7. An optical fiber having at least one Bragg grating according to claim 1, in which said second polymer is a thermoplastic.

8. An optical device incorporating a fiber having a Bragg grating, the fiber comprising a core surrounded successively by cladding and by a coating, said grating being obtained by being written directly in the core or the cladding of the fiber through the coating which is made of a material that is substantially transparent to ultraviolet radiation used for lighting said grating, wherein the material of said coating contains a first polymer network interpenetrated with a second polymer.

9. An optical fiber having at least one Bragg grating according to claim 3, in which the first component is a photocurable polymer precursor carrying a photocuring function selected from acrylate, methacrylate, thiol polyene, epoxy, and vinyl ether functions, and said second component is a precursor for a thermocurable polymer.

10. An optical fiber having at least one Bragg grating according to claim 1, in which said material is obtained from a liquid mixture comprising 64.5% by weight of a precursor of photocurable silicone and 35.5% by weight of a precursor of thermocurable silicon.

11. An optical fiber having at least one Bragg grating according to claim 1, in which said second polymer is a thermoplastic selected from polyvinylidene fluorides and copolymers of polyvinylidene fluorides and polyhexafluoropropene.

12. An optical fiber, comprising:

a core;

a cladding surrounding the core;

a coating surrounding the cladding; and at least one Bragg grating;

wherein the coating comprises a material that is substantially transparent to the ultraviolet radiation, the material comprising a first polymer network interpenetrated by a second polymer network.

13. The optical fiber according to claim 12, wherein the Bragg grating is directly written in the core or the cladding through the coating.

14. The optical fiber according to claim 12, wherein the first and second polymer networks are intermeshed.

15. The optical fiber according to claim 14, wherein the first and second polymer networks are substantially not crosslinked with each other.

16. The optical fiber according to claim 15, wherein the first polymer network has crosslinked chains and the second polymer network has crosslinked chains.

17. The optical fiber according to claim 15, wherein the first polymer network is a 3-D network.

18. The optical fiber according to claim 12, wherein the first polymer network and the second polymer network are heterogeneous.

* * * * *